Oct. 5, 1948.　　　　R. L. SAIFYRD　　　　2,450,565
TRANSMISSION CHAIN LINK
Filed June 25, 1946

Richard L. Saifyrd
INVENTOR

BY Burgess Ryan & Hicks
ATTORNEYS.

Patented Oct. 5, 1948

2,450,565

UNITED STATES PATENT OFFICE 2,450,565

TRANSMISSION CHAIN LINK

Richard L. Saifyrd, Hartford, Conn., assignor to The Whitney Chain & Mfg. Co., Hartford, Conn., a corporation of Connecticut Application June 25, 1946, Serial No. 679,156

3 Claims. (Cl. 74—250)

This invention relates to links for industrial transmission chains and has for its general object a construction which, while relatively inexpensive, provides for maximum strength and freedom from wear, thus to insure a long life for the chain even under excessive strain.

With the foregoing and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, Fig. 1 is a side elevational view of a preferred form of link plate;

Figure 1:
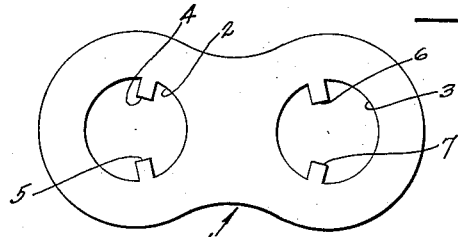

The link of the present invention incorporates a pair of link plates of which one is shown in Fig. 1 generally designated 1, which plates can be of conventional contour and, as usual, provided with openings 2, 3 adjacent the ends of the plate. The openings are of cylindrical outline, but interrupted by radially inwardly directed ears such as shown at 4, 5, 6 and 7. In this instance, and as is preferred, two such ears are provided for each plate opening, and they are all of rectangular outline. As illustrated, the ears are unsymmetrically spaced with reference to the circumference of the opening, that is, they are located less than 180° apart and are substantially equally spaced on each side of that point of one of the openings which is nearest to the companion opening in the same link plate.

Figure 2:
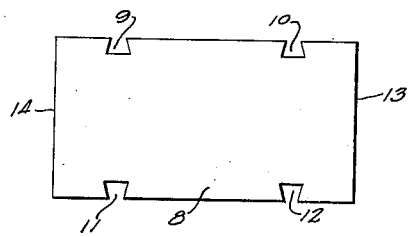
Fig. 2 is a plan view of a stamping from which one of the bushings is to be formed.
Figure 3:
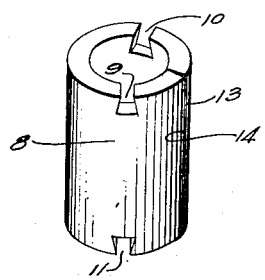
Fig. 3 is a perspective view of a completed bushing.

As will be understood, the openings 2 and 3 are designed to receive the link bushings, each bushing preferably being formed from sheet stock and curled to cylindrical form to provide a snug fit with the bushing openings. As shown in Fig. 2, each bushing may be formed from a rectangular stamping 8 thereafter curled into the form shown in Fig. 3. The upper and lower edges of the stock 8 (which later form the ends of the bushing) are provided with dovetail recesses 9, 10, 11, 12, which are so spaced as to register with the bushing opening ears when the stock is curled to its cylindrical form. Also, the recesses are so located as to bring the seam or meeting edges 13, 14 of the curled bushing to a point midway between the bushing opening ears on the side of the bushing opening nearest the companion opening of the same link plate.

The entrances to the recesses 9, 10, 11 and 12 are somewhat narrower than the ears 4, 5, 6 and 7, so that the bushing has to be forced into place under pressure. It has been found that, if the bushing is case-hardened and the link plate rendered tough but not hard (say heat treated to Rockwell 40-45), the forcing of the bushings into their openings in registry with the ears causes the latter to swell and conform their outline to that of the recesses, thereby forming a very secure interlock between the bushings and the link plates. As will be understood, the bushings are pressed home until the base of each recess seats against that ear with which it registers, thus insuring a fixed and permanent spacing of the link plates so far as compressive strains are concerned.

At high speed, chain links of this general character as ordinarily constructed are pounded to such an extent as to exhibit a tendency to spread the link plates, but it has been found that when the plates and bushings are constructed and interlocked in the manner described, this tendency is overcome. It will also be observed that by reason of the unsymmetrical spacing of the ears and recesses, there is only one way in which the bushings and link plates can be assembled and that way is such that the meeting edges 13, 14 of the curled bushing are permanently located remote from the point where the strain and greatest wear are concentrated.

Figure 4:
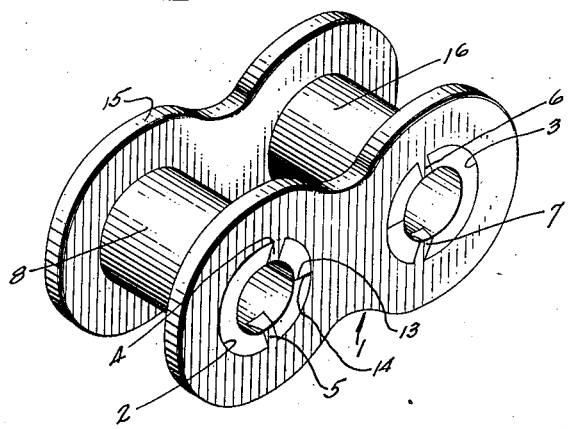
Fig. 4 is a perspective view of the completed link in its preferred form.

In the completed link illustrated in Fig. 4 a plate 1, such as above described, is shown assembled with an identical plate 15 and interlocked with it by a bushing 8, such as above described, and an identical bushing 16.

The following is claimed:

1. A transmission chain link comprising a pair of link plates having bushing openings adjacent their ends, each opening being of circular outline interrupted by two radially inwardly directed ears located less than 180° apart and equally spaced on each side of that point of a bushing opening which is nearest to the companion bushing opening in the same link plate, and a pair of sheet stock bushings curled to cylindrical form to fit said openings, and dovetail recesses in the ends of the bushings adapted to register with the said ears and to locate the meeting edges of the curled bushings substantially midway between the said ears, the recess entrances being narrower than the said ears and the relative hardness of the bushings and ears being such that the material of the ears will swell and interlock with the recesses when the bushings are forced into the plate openings.

2. In a transmission chain, the combination of a link plate having a bushing opening of circular outline interrupted by radially inwardly projecting ears unsymmetrically spaced with reference to the circumference of the opening, a sheet stock bushing curled to cylindrical form to snugly fit said opening, and dovetail recesses in the end of the bushing located to register with said ears, the recess entrances being narrower than the said ears and the relative hardness of the bushing and ears being such that the material of the ears will swell and interlock with the recesses when the bushing is forced into the plate opening.

3. In a transmission chain, the combination of a link plate having a bushing opening of circular outline interrupted by radially inwardly projecting ears unsymmetrically spaced with reference to the circumference of the opening, a bushing dimensioned to fit said opening, and dovetail recesses in the end of the bushing located to register with said ears, the recess entrances being narrower than the said ears and the relative hardness of the bushing and ears being such that the material of the ears will swell and interlock with the recesses when the bushing is forced into the plate opening.

RICHARD L. SAIFYRD.

REFERENCES CITED

The following references are of record in the file of this patent:

UNITED STATES PATENTS

| Number | Name | Date |
|---|---|---|
| 1,235,321 | James | July 31, 1917 |
| 1,361,821 | Briggs | Dec. 14, 1920 |